J. BOMA.
NUT TAPPING MACHINE.
APPLICATION FILED DEC. 19, 1908.

947,961.

Patented Feb. 1, 1910.
5 SHEETS—SHEET 1.

FIG. 1

Witnesses:
F. C. Valentine
N. G. Rinehart

Inventor:
John Boma
by Obed B. Billman
his attorney.

J. BOMA.
NUT TAPPING MACHINE.
APPLICATION FILED DEC. 19, 1908.

947,961.

Patented Feb. 1, 1910.
5 SHEETS—SHEET 3.

Witnesses:
F. C. Valentine
M. G. Rinehart

Inventor:
John Boma
By Obed C. Billman
his attorney.

UNITED STATES PATENT OFFICE.

JOHN BOMA, OF CLEVELAND, OHIO, ASSIGNOR, BY DIRECT AND MESNE ASSIGNMENTS, TO THE PNEUMATIC NUT MACHINE COMPANY, OF CLEVELAND, OHIO.

NUT-TAPPING MACHINE.

947,961.          Specification of Letters Patent.          Patented Feb. 1, 1910.

Application filed December 19, 1908. Serial No. 468,265.

*To all whom it may concern:*

Be it known that I, JOHN BOMA, a citizen of the United States, residing at Cleveland, in the county of Cuyahoga and State of Ohio, have invented certain new and useful Improvements in Nut-Tapping Machines, of which the following is a specification.

My invention relates to improvements in nut-tapping machines, the primary object of the invention being to provide a generally improved automatic machine of this class in which the various parts are so arranged and disposed relative to each other as to provide a perfect working machine adapted to hold and feed the nut-blanks rapidly and accurately in such a position relative to the taps as to result in the formation of a perfectly formed thread and properly faced nut.

Another object is to provide improved operating mechanism adapted to actuate, and coöperate with, the various parts in a perfectly harmonious manner with a view to reducing to a minimum any liability of disarrangement or breakage of parts.

Another object is to provide the various operating mechanism with "safety" devices adapted to prevent the actuation of any device when the device with which it is designed to coöperate is not properly positioned for such coöperation.

A further object is to provide an improved nut-blank holding and feeding mechanism adapted to uniformly feed the nut-blanks with their face sides toward the taps whereby said nut-blanks will be uniformly tapped from their face sides and providing means whereby the face sides of the tapped-nuts may be faced by the tap socket portion of the revolving tap spindle after the tapped nut has been forced over the tap by the nut-blank holding and feeding carriage.

A still further object is to provide pneumatic means for operating the nut-blank holding and feeding carriages whereby said carriages are resiliently moved toward the taps to feed the nut-blanks thereon in the feeding operations of the carriages, said pneumatic means being arranged to coöperate with the mechanism for intermittently revolving the revoluble turret.

With the above-mentioned, and other objects in view, the invention consists in the novel construction, arrangement, and combination of parts, hereinafter described, illustrated in the accompanying drawings, showing one embodiment of the invention, and particularly pointed out in the appended claims.

Referring to the accompanying drawings, forming a part of this specification.

Similar numerals of reference designate like parts throughout all the figures of the drawings.

The improved machine, in its present embodiment, comprises a bed or frame 1, supported upon the usual standards or legs 2. A main driving-shaft 3, extends longitudinally of the bed or frame 1, and is mounted in suitable bearings at the ends thereof. The driving shaft 3, is provided at each end with a sprocket wheel 4, and is provided at one end with a cone or stepped pulley 5, adapted to receive a belting communicating with any suitable and convenient source of power.

A revoluble turret 6, is mounted upon the bed or frame 1, and in the present instance, midway of the ends thereof by means of a turret supporting-frame or block 7. The turret supporting-block is, preferably, made up of two parts or members, the lower part or member 7ª, being adapted to rest directly upon the bed or frame 1, and to support the internal gearing of the turret hereinafter described. The turret is adapted to be intermittently revolved within the block or frame 7, and is provided with an annular bearing flange 8, seated within a corresponding annular bearing recess in the top or face side of the frame or block 7. The turret is adapted to be secured and intermittently revolved within the frame or block 7, by means of a gear ring 9, keyed to the lower portion of the cylindrical main body portion 10, of the turret, said gear ring 9, being fitted within an annular bearing recess 11, on the under side of the turret block 7. When the several parts are assembled the upper and lower members 7 and 7ª, of the turret-block may be bolted down upon the bed or frame 1, in any suitable and convenient manner. The gear-ring 9, meshes with a gear 12, loosely mounted upon the driving shaft 3, said gear 12, being adapted to be intermittently revolved with the shaft 3, by means of a longitudinally movable clutch 13, keyed upon the shaft 3, and adapted to be moved into and out of frictional engagement with the gear 12, by means of a pivotally mounted shifting lever 14, carried by the frame 1, and adapted to be actuated by the mechanism hereinafter described.

Figure 4:
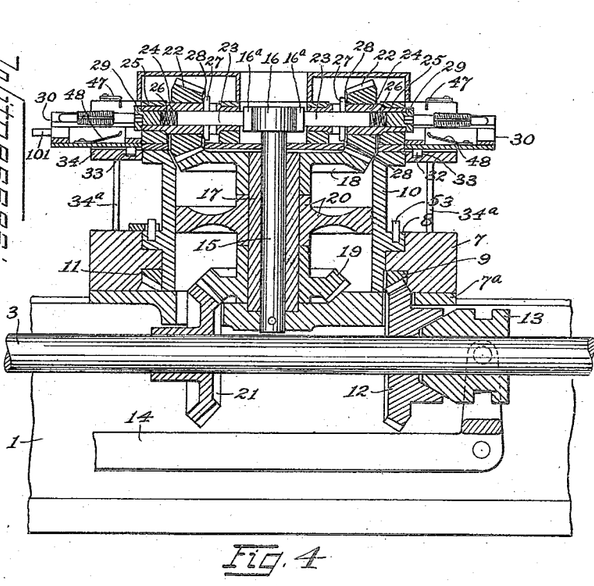
Fig. 4, a cross-sectional view of the revoluble turret carrying a plurality of revoluble radially-extending tap-spindles and tap-holding and reciprocating devices.

The internal gearing of the turret comprises a vertical cam-shaft 15, mounted and keyed at its lower end in the lower member 7ª, of the turret block and provided at its upper end with a cam-head 16, having oppositely-disposed cam projections 16ª. A vertical sleeve driving-shaft 17, is loosely mounted upon the cam-shaft 15, and is provided at its upper and lower ends with horizontal gears 18 and 19. The intermediate portion of the driving shaft 17, is mounted within a bearing opening of an internal bearing head or disk 20, within the cylindrical main body portion 10, of the turret and the upper and lower gears 18, and 19, keyed upon the ends of the sleeve shaft 17, are supported by said internal bearing disk 20, and are adapted to abut and have a bearing thereon as shown. The sleeve shaft 17, together with the gears 18 and 19, carried thereby are adapted to be given a continuous rotary motion upon the cam-shaft 15, by means of a fixed gear 21, carried upon the driving-shaft 3, and meshing with the gear 19. The gear 18, meshes with a plurality of pinion gears 22, loosely mounted upon a plurality of radially-extending longitudinally movable spindles 23, through the medium of sleeves or bushings 24. The sleeve portions 24, of the tap-spindles are mounted in suitable bearings 25, of the revoluble turret 6. The longitudinally movable portions 23, of the spindles are adapted to be moved against the resistance of inner springs 26, by being engaged by and riding upon the oppositely-disposed cam projections 16ª, when the turret is revolved. The movable spindle portions 23, are provided with cross key-pins or similarly shaped key projections 27, adapted to move into engagement with similarly shaped key-pins or projections 28, of the gears 22, and sleeve portions 24, of the spindles when said spindle portions 23, are shifted by the oppositely-disposed cam-projections 16ª, so that when the turret is in its normal or stationary position two diametrically opposite tap-spindles will be in gear with the gears 22, carried thereby, as indicated most clearly in Figs. 4 and 5, of the drawings. The sleeve portions 24, of the spindles are provided with tap-socket and nut-facer portions 29, adapted to revolve the taps when moved into engagement therewith by the tap holding and reciprocating devices hereinafter described.

The tap holding and reciprocating devices comprise a plurality of radially-extending guide supporting-plates 30; mounted in a plurality of radially-extending guide-ways 31, formed in the turret 6, opposite and outside of the radially extending tap-spindles.

Figure 9:
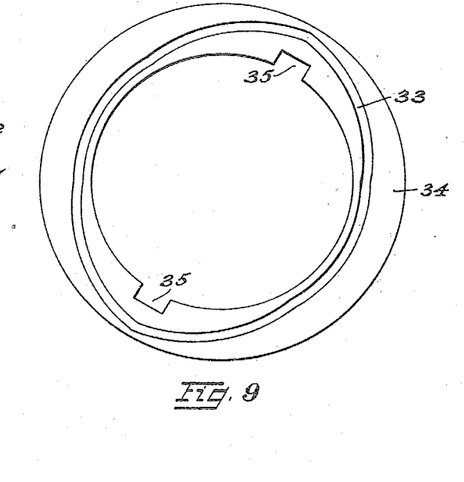
Fig. 9, a plan view of the turret cam-ring for reciprocating the tap holding and reciprocating devices carried by the revoluble turret.

The guide-supporting-plates 30, are adapted to be reciprocated during the revolution of the turret by means of depending friction rollers 32, taking into and traveling within a cam-slot 33, of a cam-plate 34, mounted immediately beneath the overhanging portion of the turret 6. The cam-plate is supported and held in position by means of standards 34ª, secured to and extending up from the turret-block 7. Oppositely-disposed notches or nut discharge openings 35, (see Fig. 9) are formed on the inner periphery of the cam-plate 34, and the disposition of the cam-slot 33, is such relative to the oppositely-disposed revolving tap-spindles held in gear with the gears 22, by means of the oppositely-disposed cam-projections 16ª, as to cause the guide-supporting-plates at this point to be moved to their extreme inner travel for the purpose of holding the taps in engagement with said oppositely-disposed revolving tap-spindles as hereinafter described.

Figure 14:
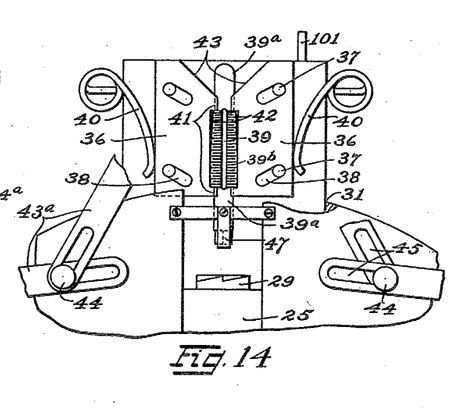
Fig. 14, an enlarged detail plan view of one of the tap-holding and reciprocating devices carried by the turret.

Each reciprocating guide-supporting-plate carries a pair of spring-resisted tap-guide jaws 36, said guide-jaws, in the present instance, being slidably mounted on the top side of the guide supporting-plate by means of guide-pins 37, extending upwardly from the supporting-plate and taking through guide-slots 38, of said guide-jaws whereby a limited movement is provided for the latter. The guide-jaws are held toward each other in a position to grasp the tap 39, by means of springs 40, in the present instance, secured to the sides of the supporting-plate 30, and having their free ends bearing against the outer sides of said guide-jaws. The inner or tap bearing sides of the guide-jaws are provided with longitudinally-extending grooves 41, (see Fig. 14) as a means for effectively receiving and holding the stem or shank portions 39ª, of the taps and are also provided with recess notches or pockets 42, for receiving the threaded body portion 39ᵇ, of the taps whereby to effectively prevent any longitudinal movement of the tap while being grasped by the guide-jaws. The outer ends of the guide-jaws are also provided with inwardly converging beveled portions 43, forming the flaring guide ends for the reception of the front ends of the nut-blank holding and feeding carriages hereinafter described. A pair of link arms 43ª, are secured at their inner ends to the top side of the turret by means of guide-pins 44, extending through guide-slots 45, and into the top side of the turret. The outer ends of the guide arms terminate in inwardly-extending guide-hooks 46, pivotally secured to the outer ends of the guide-jaws 36. The link-arms 43, coöperate with the guide-jaws in imparting a proper spreading movement to the latter when the beveled portions 43, of the guide-jaws and the beveled portions of the guide-hooks 46, are engaged by the ends of the nut-blank holding and feeding carriages herein referred to.

As a means for disengaging the tapped-nut from the angled stem or shank portion of the tap when the latter together with the nut-blank feeding carriage are withdrawn, a pair of spring-arms 47, and 48, are provided, said spring-arms 47 and 48, being adapted to be sprung and forced outwardly away from the tap and over the nut when the latter is being fed over the tap by the nut feeding carriage.

Figure 5:
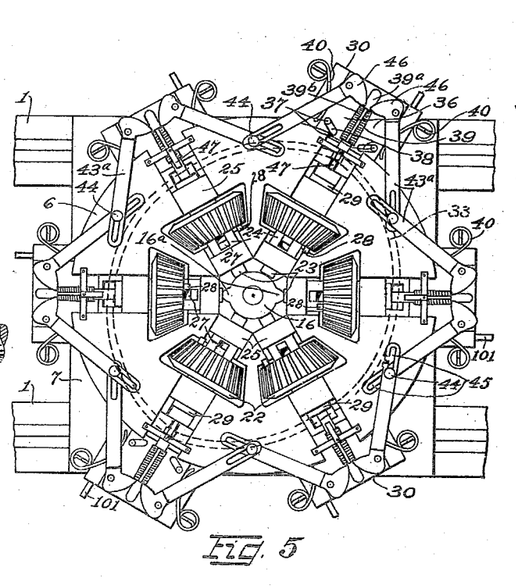
Fig. 5, a top plan view of the revoluble turret with the gear-cap or cover removed for the purpose of clearer illustration of the parts.
Figure 6:
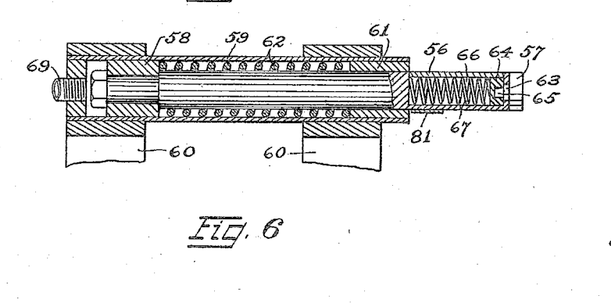
Fig. 6, a longitudinal sectional view of one of the pneumatically operated nut-blank holding and feeding carriages.

It is obvious that the spring-arms 47, will engage with the rear side of the tapped nut and disengage the latter when the tap is moved by the tap carrying and reciprocating devices to its extreme outward travel as indicated in Fig. 5, of the drawings whereby the tapped-nut will drop down through the nut-discharge openings 35, of the cam-plate below, and be discharged when the tap carrying and reciprocating devices have been moved to their extreme outer positions.

As a means for stopping the revoluble turret at proper intervals during its intermittently revolving motion, a pawl 49, is horizontally pivoted upon the top of the turret frame or block 7, by means of a pivot-pin 50, said pawl being provided with hooks 51 and 52, adapted to coöperate with a series of stop pins 53, arranged at suitable intervals about the turret. The pawl is adapted to coöperate with the stop-pins 53, in the usual manner, and, in the present instance, is adapted to be moved to a position to disengage the stop-hook 51, by means of a sliding bolt 54, mounted on the turret block 7, by means of a bracket 55, adapted to be engaged by a bracket of the nut-blank holding and feeding carriage as hereinafter described.

The nut-blank holding and feeding carriages each comprise a horizontal reciprocating bar 56, provided at its front end with a nut blank receiving and holding pocket 57, and, in the present instance, is provided at its rear end with a piston-head 58, said bar 56, being adapted to reciprocate in a guide cylinder 59. The guide cylinder is mounted in a pair of brackets 60, and is provided at its front end with a bearing head 61. A coil-spring 62, surrounds the reciprocating bar 56, and is interposed between the bearing head 61, and piston-head 58, so that the forward or feeding motion of the carriage (preferably operated by compressed air, as hereinafter described) is adapted to operate against the resistance of the coil spring 62.

An opening 63, is formed at the rear of the nut-blank receiving and holding pocket 57, of sufficient size to receive and pass over the tap during the nut-blank feeding operation of the carriage. A movable spring resisted block 64, is mounted at the rear of the opening 63, at the front or fixed end of the carriage bar 56, and is provided with a bearing-opening 65, adapted to receive and support the stem or shank portion 39ª, of the tap during the forward or feeding motion of the carriage and while the nut-blank is being fed over the tap. It is evident that by reason of the formation of the stem or shank portion 39, of the tap that the latter will be self centered as it finds its way into the opening 63, of the block 64, and before the nut-blank reaches the threaded body portion of the tap. During this nut-blank feeding operation the block 64, is moved rearwardly in the guide-chamber 66, and against the resistance of the coil spring 67, located in said guide-chamber.

The pneumatic mechanism for operating the nut-blank holding and feeding carriage comprises an air cylinder 68, provided with laterally-extending air or fluid conduit pipes 69, leading to the rear ends of the guide cylinders 59. The air or fluid-inlet pipe 70, communicates with the tank of any suitable and convenient air compressing mechanism. The compressed air or operating fluid is adapted to be intermittently restrained within the cylinder 68, for the purpose of transmitting the same through the medium of the conduit pipe 69, for the feeding operation of the carriages, by means of a vertically movable valve comprising a piston-head 71, a depending valve-stem 72, and an upwardly-extending valve stem 73.

The valve stem 73, extends through a suitable stuffing box and is provided with a flanged head 74, adapted to coöperate with valve releasing mechanism hereinafter described.

Figure 1:
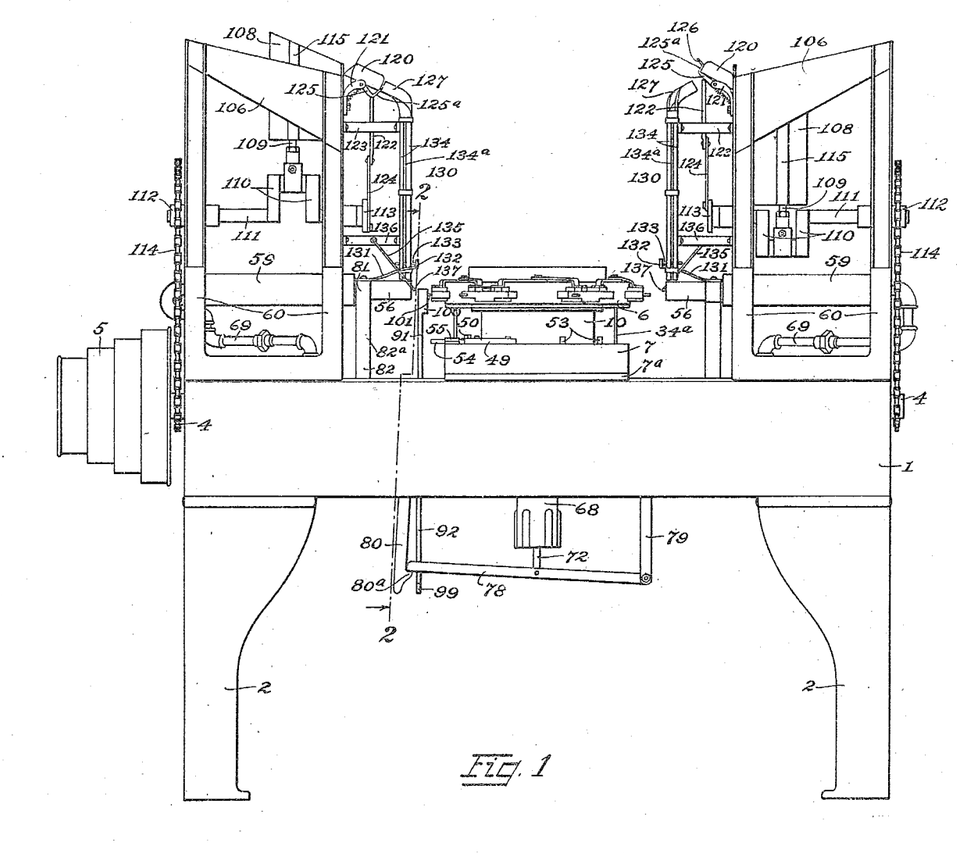
Figure 1, is a side elevation of an improved nut-tapping machine constructed in accordance with my invention.
Figure 3:
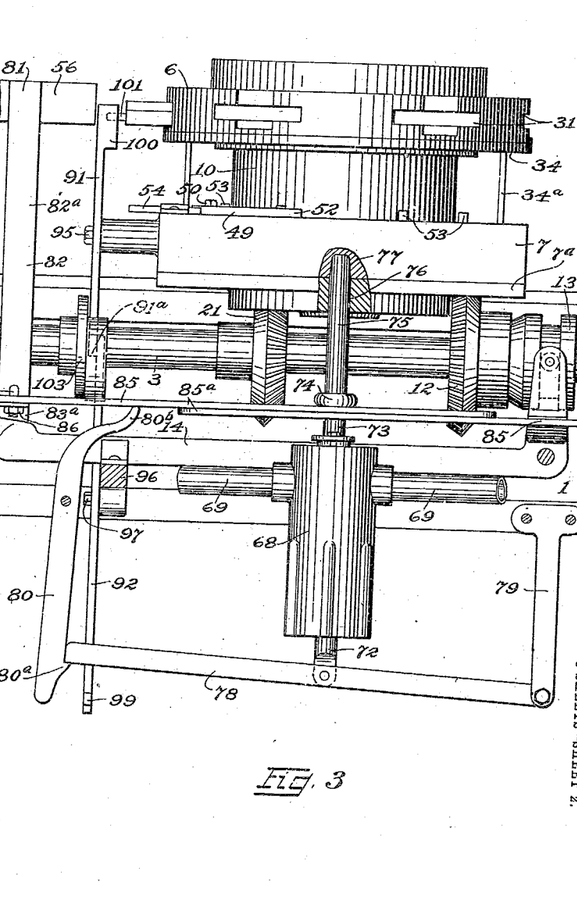
Fig. 3, a side elevation of the same, one of the side walls of the supporting bed or frame of the machine being removed for the purpose of clearer illustration of the parts.
Figure 18:
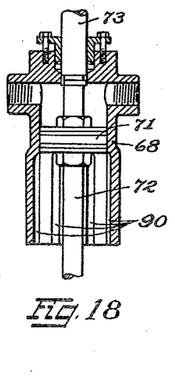
Fig. 18, a longitudinal sectional view of the pneumatic cylinder and valve of the pneumatic mechanism for operating the nut-blank holding and feeding carriages.

When the piston-head 71, is elevated for the utilization of the operating fluid, as shown in Figs. 1, 3, and 18, of the drawings, the upper portion of the valve-stem 73, forms a stop-pin 75, adapted to enter an opening 76, in the turret block or frame and an opening 77, of a plurality of openings formed at suitable intervals in the bottom portion of the turret. As a means for initially elevating and supporting the piston-head for the utilization of the operating fluid in moving the nut-blank holding and feeding carriages in their feeding movements, the depending valve stem 72, is pivotally connected to a lever-bar 78, one end of said lever-bar being pivotally connected to a depending bracket 79, and the other or free end of which is adapted to be elevated, when the turret is in its normal or proper stationary position, by operating mechanism hereinafter described, and when so elevated the free end of the lever-bar 78, is engaged and held during the initial movements of the carriages by means of a pivotally-mounted depending latch-bar 80.

Figure 7:
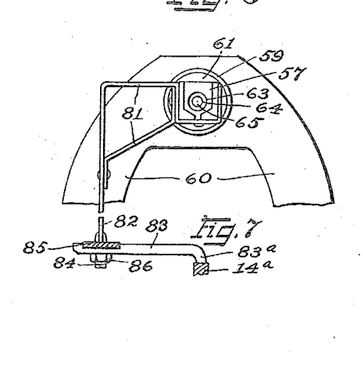
Fig. 7, a view of the front end of the same, with attached depending bracket mechanism for coöperating with unlocking and shifter mechanism for intermittently releasing and revolving the turret, and also coöperating with pneumatic mechanism for pneumatically operating the nut-blank holding and feeding carriages when the turret is in its normal position.
Figures 15, 16, 17:
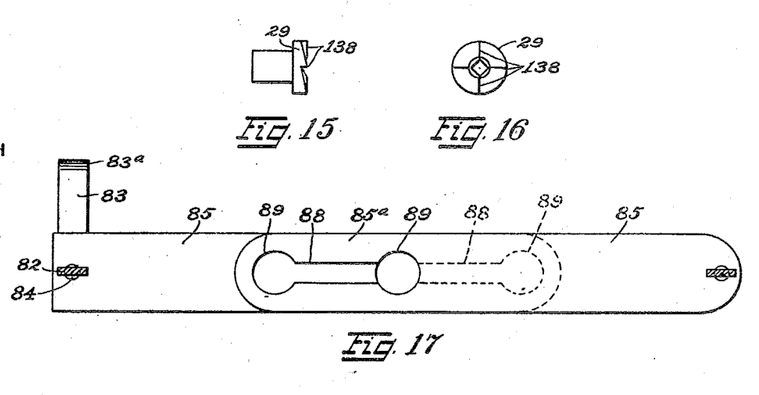
Fig. 15, a detail view of a tap-socket and nut-facer carried by each tap spindle for the purpose of facing the nut when driven over the tap.
Fig. 16, a face view of same.
Fig. 17, a top plan view of the pneumatic piston carrying and releasing plates carried by the pneumatically operated nut-blank holding and feeding carriages.

As a means for providing mechanism for holding the shifting lever 14, in a position to hold the movable clutch 13, in frictional engagement with the gear 12, for the movement of the turret while the carriages are in their normal position and also as a means for providing for the support of the piston-head 71, in an elevated position while the carriages are feeding the nut-blanks over the taps, as well as providing for the dropping of the piston-head for the release of the pressure of the operating fluid and the return of the carriages after they have moved to their extreme feeding positions, the front ends of the reciprocating carriage bars 56, are provided with and carry depending brackets comprising a laterally-extending upper bracket portion 81, a vertically-extending bar portion 82, and a laterally-extending arm or bar 83 (see Figs. 3 and 7). The lower end of the vertical bar portion 82, is provided with a depending bolt 84, extending through a longitudinal slot in one end of a longitudinally-extending piston carrying and releasing plate 85. The bolt 84, is adjustably secured in the longitudinal slot of the plate 85, by means of an adjusting nut 86, for the purpose of regulating the extreme forward feed of the carriages as hereinafter described. The piston carrying and releasing plates 85, extend toward each other and overlap above the air cylinder 68. These plates 85, are longitudinally supported in guide supporting brackets 87, (see Fig. 2) secured to the frame 1, of the machine and the overlapping portions 85ª, of the plates are provided with longitudinally-extending valve-stem guide slots 88, (see Fig. 17), said guide-slots taking over the upwardly-extending valve-stem 73, and provided with enlarged terminal openings 89. The terminal openings 89, are of sufficient size to allow of the vertical passage therethrough of the flanged-head 74, of the valve-stem 73, when the carriages are in their normal and extreme nut-blank feeding positions, respectively.

The piston carrying plates 85, are adapted to support the piston in its elevated position during the last portion of the feeding movements of the carriages, and it is evident, that the piston cannot be released for the discharge of air pressure until both carriages have been moved to their extreme feeding positions at which time the terminal openings 89, will meet and register with each other directly below the flanged head 74, and thus release the piston-head. When the piston-head is moved to its lower position, the operating fluid will escape past it through the medium of the vertically-formed fluid-escape channels 90, formed in the inner periphery of the lower portion of the air cylinder 68, (see Fig. 18). This release of the pressure of the operating fluid will cause the carriages to be returned to their normal position by means of the coil-spring 62. When the carriages are returned to their normal or initial position the inner or free end 83ª, of the arm or bar 83, of one of the brackets carried by one of the carriages, (see Figs. 3 and 7) engages with an upwardly-extending inclined portion 14ª, of the shifting lever 14, whereby the movable clutch 13, is moved into frictional engagement with the gear 12, for the revolution of the turret.

As the turret is revolved it is stopped in its proper position by one of the stop-pins 53, coming into engagement with the stop-hook 51, of the pawl 49, hereinbefore referred to, and the turret is also engaged by a movable stop lever forming part of the mechanism to be now described.

Figure 2:
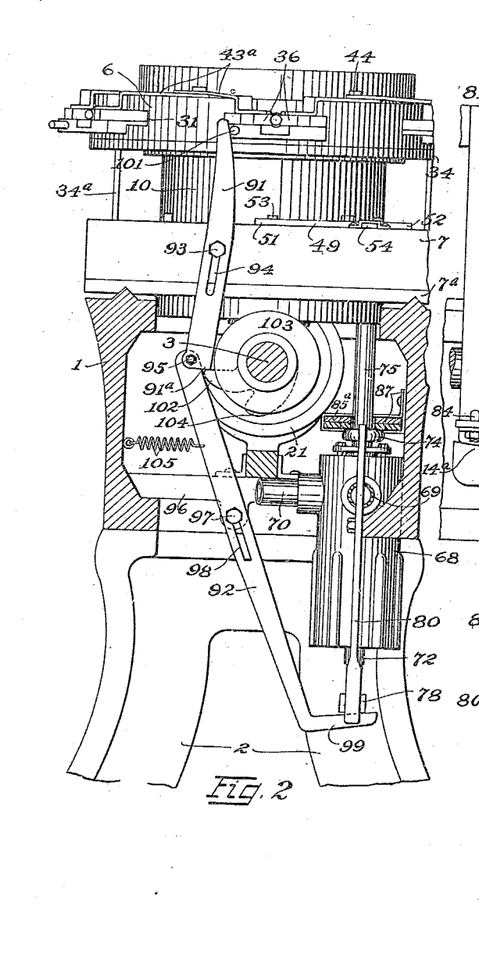
Fig. 2, an enlarged transverse cross-sectional view, taken through line 2—2, of Fig. 1, and showing the revoluble turret portion of the machine and mechanism for intermittently revolving said turret.

The mechanism for elevating the free end of the lever bar 78, incident to the elevation of the piston-head 71, in the air cylinder 68, prior to the initial movements of the nut-blank holding and feeding carriages, comprises a pair of vertically movable and pivotally-mounted arms consisting of an upwardly-extending and projecting arm 91, and a downwardly-extending and projecting lower arm 92. The upper arm 91, is pivotally-secured to the turret block or frame by means of a pivot-bolt 93, taking through a longitudinal guide-slot 94, and the lower portion of said upper arm is pivotally-secured to the upper end of the lower arm 92, by means of a pivot-bolt 95. The lower arm 92, is pivotally secured to a cross arm 96, of the frame of the machine by means of a pivot-bolt 97, taken through a longitudinally-extending guide-slot 98. The lower end of the arm 92, is provided with a hook or bracket portion 99, adapted to take under and engage with the free end of the lever-bar 78, when the arms 91, and 92, are elevated by the means now described. When the arms 91, and 92, are in their lower or normal positions a lateral projection 100, at the upper or free end of the arm 91, is adapted to be engaged by a pin 101, of one of the guide-supporting-plates 30, of the turret whereby said arm is moved to its proper position. The lower end of the arm 91, is so pivotally-secured and disposed relative to the upper end of the arm 92, as to provide a projecting shoulder portion 91ª, adapted when so moved to be engaged by a cam projection 102, of a cam 103, on the driving-shaft 3. The engagement of the cam-projection with the shoulder portion 91ª, elevates the arms 91 and 92, and in so doing the lateral projection 100, is carried above the pin 101, and when the arms have been carried to their extreme upper position a second cam-projection 104, comes into engagement with the upper portion of the lower arm 92, whereby said upper portion of the arm 92, is thrown outwardly away from the shaft 3, and is carried off of the cam-projection 102. During this movement the latch head 80ª, of the depending latch member 80, has engaged the free end of the lever bar 78, whereby the latter is initially held in its elevated position when the projecting shoulder portion 91ª, is being carried off of the cam-projection. When the arms 91, and 92, are moved to their extreme elevated positions the lateral projection 100, of the upper arm is elevated sufficiently to clear the stop-pin 101, and just at this moment the second cam-projection 104, engages with the upper portions of the arm 92, whereby this portion of the arm 92, together with the lower portion of the arm 91, are moved away from the driving-shaft 3, and it is obvious that this movement will cause the upper or opposite end of the arm 91, to be moved in an opposite direction and will carry the lateral projection 100, to the opposite side of the stop pin 101, so that the shoulder portion 91ª, is carried off of the cam-projection 102, the arms will fall by gravity to their normal or initial position and the lateral projection 100, will be carried on the opposite side of the stop-pin 101, as indicated in Fig. 3, of the drawings. A spring 105, is secured to the upper portion of the lower arm 92, and is adapted to hold the arms 91 and 92, in their normal position as indicated in Fig. 2, of the drawings, said figure of the drawings illustrating the position of the arms prior to their elevation in the act of carrying the free end of the lever-bar 78, upwardly to be engaged by the depending latch member 80.

When the arms 92, and 93, have returned to their normal position the operating fluid presses the nut blank holding and feeding carriages forward in their feeding movements and during the initial movements of the carriages the end 83ª, of the arm 83, of the depending bracket of one of the carriages is carried off of the inclined portion 14ª, of the shifting lever 14, whereby the movable clutch 13, is not held in frictional engagement with the gear 12, for the revolving of the turret during the feeding movements of the cariages. During this movement the arm or bar portion 83, of the depending bracket comes into engagement with the upper end 80ᵇ, of the latch member 80, and disengages the latch head 80ª, from the free end of the lever-bar 78, but the piston-head is still held in its elevated position by means of the guide-slots 88, of the piston carrying and releasing plates 85, and will be so held until both feeding carriages have reached their extreme feeding position at which time the terminal openings will register with each other and release the valve stem 73, by permitting the flanged-head 74, to drop downwardly therethrough. During this feeding motion of the carriages the portion 82ª, of one of the vertical bars 82, of the bracket carried by one of the carriages comes into engagement with the outer end of the sliding bolt 54, which operates the pawl 49, to swing the stop-hook 51, out of engagement with one of the stop-pins 53, of the turret as hereinbefore referred to.

The mechanism for holding and properly positioning and conducting the nut-blanks one by one into the nut-blank pockets of the nut-blank holding and feeding carriages comprises a hopper 106, supported upon standards 107, of the frame work of the machine. The hoppers are arranged at each end of the machine and above the respective nut-blank feeding carriages, and are adapted to receive and contain the nut-blanks in bulk. As a means for properly discharging the nut-blanks from the hopper into the nut-blank conduits, hereinafter described, each hopper is provided with a vertically-reciprocating bucket 108, said bucket being reciprocated by means of a connecting arm 109, operated by means of a double crank 110, of a horizontal driving-shaft 111. The driving-shaft 111, is mounted in suitable bearings of the standards 107, and is provided at its outer end with a sprocket wheel 112, and at the other or inner end with a crank wheel 113. Motion is given to the driving-shaft 111, by means of a sprocket chain 114, passing over the sprocket wheel 112, and over a sprocket wheel 4, of the driving-shaft 3, whereby reciprocating motion is given to the bucket for the feeding of the nut-blanks as now described. The bucket 108, is provided with laterally-extending guide-flanges 115, working in suitable guideways of the inclined bottom 116, of the hopper.

Figure 8:
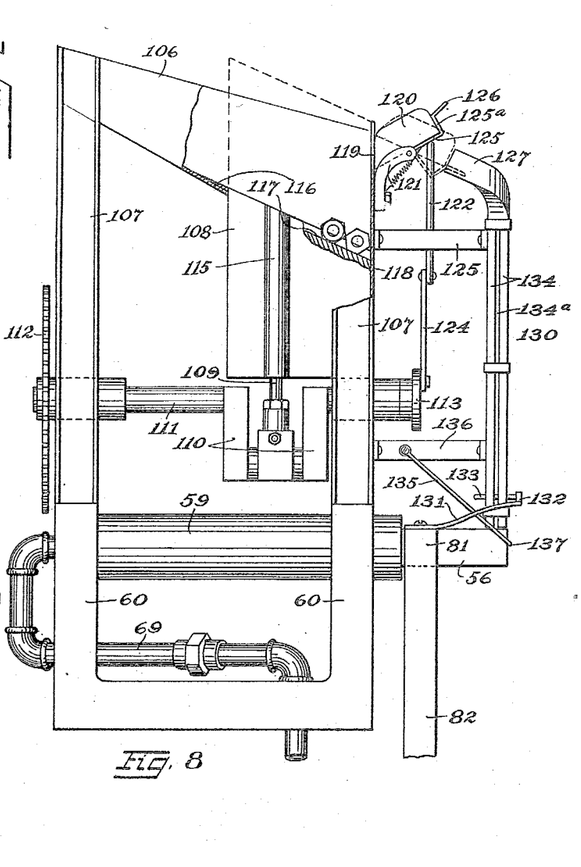
Fig. 8, a side elevation of one of the nut-blank hoppers, and end feeding conduits, together with one of the pneumatically operated nut-blank holding and feeding carriages.

Each bucket is provided with an inclined nut-blank discharging pocket groove 117, inclined toward the front wall 118, of the hopper and adapted to receive the nut-blanks in an edge wise position as indicated in Fig. 8, of the drawings, the nut-blanks being so inclined that the most forward nut-blank will abut or impinge against the front wall 118, as the bucket is elevated and when the bucket is elevated to its extreme elevated position as indicated by the dotted lines in said figure of the drawings the nut-blanks are adapted to be discharged through a discharge opening or recess 119, formed at the upper portion of the wall 118. As the nut-blanks are discharged they pass into an oscillating nut-blank positioning gate said gate being oscillated to the position indicated by the dotted lines in Fig. 8, of the drawings to receive the nut-blanks when the bucket is moved to its upper position. The nut-blank positioning gate comprises an oscillating trough member 120, pivotally mounted upon a bracket 121, and when tilted to the position shown in Fig. 8, of the drawings has its open end immediately in front of the discharge opening or recess 119. The tilting or oscillating of the trough member is accomplished by means of a vertically-reciprocating bar 122, carried in a suitable bracket of a cross bar 125, the lower end of said bar 122, being pivotally secured to a connecting bar or arm 124, connected to the crank wheel 113, of the horizontal driving shaft 111. The upper end of the vertically operating bar 122, is adapted to raise the rear end of the oscillating trough member when elevated as shown in Fig. 8, of the drawings, by engaging with a pivot member 125, on the under side of the rear portion of the oscillating trough and pivoted with the oscillating trough member to the bracket 121. The pivot member 125, is provided with an angularly-extending member 125ª, adapted to close the rear end of the oscillating trough member when the latter is elevated as shown in Fig. 8, of the drawings, said angular member 125ª, being provided with a projecting arm 126, normally adapted to rest within the inclined chute portion 127, of the nut-blank conduit to be hereinafter described.

Figure 10:
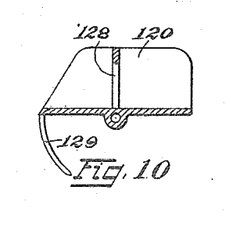
Fig. 10, a longitudinal sectional view of an oscillating nut-blank positioning gate member for uniformly delivering the nut-blanks into the nut-blank conduit with respect to their face sides.
Figure 11:
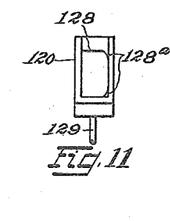
Fig. 11, a plan view of the rear end of same.
Figure 12:
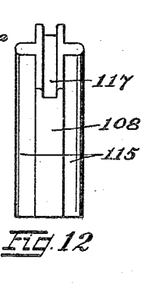
Fig. 12, a detail front elevation of the vertically reciprocating nut-blank bucket operating in a nut-blank hopper.
Figure 13:
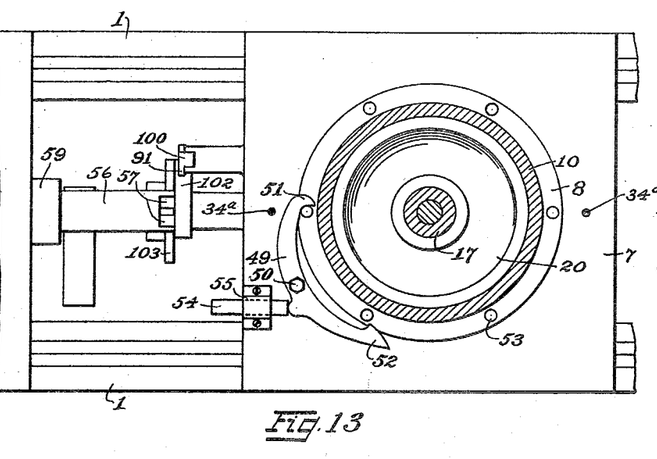
Fig. 13, a cross-sectional view through the turret body, with top plan view of turret supporting-frame or block, and pawl stop mechanism for coöperating with the intermittently revolving turret.

The nut-blank positioning gate is adapted to uniformly deliver the nut-blanks into the nut-blank conduit by having its oscillating trough member provided with an eye 128, conforming in its outline to the contour of the nut-blanks whereby the nut-blanks are fed therethrough in one uniform position (see Fig. 11 of the drawings.) By this arrangement it is obvious that the nut-blanks can only pass through the eye 128, in the one position. For example, the first nut-blank shown in the pocket groove of the hopper and bearing against the front wall 118, when elevated, will pass into the nut-blank positioning gate, and its rounded or beveled side being on the same side with that of the rounded or beveled side 128ª, of the eye of the oscillating trough member, will pass freely therethrough, but should the second and reversely positioned nut-blank shown in Fig. 8, of the drawings, enter the oscillating trough member the angular points on its face side would engage with the rounded or beveled sides 128ª, and the nut-blank would thus be prevented from entering through the eye of the oscillating trough member. Consequently, as the trough member is elevated as shown in said figure of the drawings the nut-blank is thrown back or returned into the hopper and this operation continued with all such nut-blanks as are improperly presented into the nut-blank positioning gate. As a means for preventing the nut-blanks from passing out through the discharge opening or recess 119, of the front wall of the hopper the front or receiving end of the oscillating trough member is provided with a depending guard bar 129, (see Figs. 10 and 11) which will block the passage or opening 119, when the bucket is elevated, while the front or receiving end of the oscillating trough is elevated, as shown by dotted lines in Fig. 8, of the drawings.

By reason of the construction of the nut-blank positioning gate as just described, it is obvious that the nut-blanks will all be fed into the inclined chute portion 127, in but one position relative to the face sides of the nut-blanks and, consequently, as they fill into the vertical portion 130, of the nut-blank conduit they will all be presented with their face sides so that as filled one by one into the nut-blank pocket of the nut-blank holding and feeding carriage only the face sides of the nut-blanks will be presented and driven over the taps.

It will be observed that each nut-blank holding and feeding carriage reciprocates beneath the discharge end of the nut-blank conduit and that the nut-blank receiving and holding pocket of the carriage is adapted to register with and receive a nut-blank from said discharge end of said conduit when said carriage is returned to its initial or normal position, and as a means for successively engaging and releasing the nut-blanks as said carriage is reciprocated whereby said nut-blanks are released and fed one by one into the nut-blank receiving and holding pocket of said carriage, the reciprocating carriage bar 56, is provided with an upwardly and outwardly-extending supporting-arm 131, bent near its end into a transversely disposed arm 132, terminating in a horizontal rearwardly-extending feed regulating pin 133. The feed regulating pin 133, is adapted to pass through an opening formed in each of the channel bars 134, making up the nut-blank conduit, near the lower or discharge end thereof, and said feed regulating pin is adapted to pass through the opening in the next to the lowermost nut-blank in said conduit whereby said feed regulating pin alternately engages and releases one of the nut-blanks as said carriage is returned to and moved out of its initial or normal position, respectively, and whereby only one nut-blank is free to drop into said pocket of the carriage when the latter is returned to its normal or initial position. By this arrangement it is obvious that should an improper form of nut-blank find its way into the conduit, as for example,—a blank without an opening in it, the end of the feed regulating pin will come into engagement with the blank and will prevent the return of the carriage to its normal position.

As a means for temporarily supporting and releasing the nut-blank in the pocket of the carriage as the latter is moved to and from its initial or normal position, respectively, a "safety" latch bar 135, is pivotally secured at one end to the lower supporting-bar 136, connected to the conduit, and said latch bar is inclined downwardly and outwardly and terminates at its front end in a laterally-extending cross bar or pin 137, taking over the open end of said pocket and impinging against the end of the carriage when the latter is in its initial or normal position and adapted to be elevated and travel over said carriage when the same is being moved to and from its extreme nut-blank feeding position. By this arrangement it is obvious that it will be impossible for a nut-blank to fall out of the open end of the pocket when the nut drops into the pocket from the feed end of the conduit while the carriage is in its initial or normal position.

The location and position of the nut-blanks in the nut-blank conduit may be observed by means of the sight-slot or opening $134^a$, formed between the channel bars 134, and when the said conduit is entirely filled with nut-blanks the projecting arm 126, of the pivot member 125, will come into engagement with the first nut-blank in the inclined chute portion 127, and the member $125^a$, will close the open or discharge end of the oscillating trough member 120, and prevent any further discharge of nut-blanks.

As a means for facing the tapped nuts after the latter have been forced over the taps the tap-socket and nut-facer portions 29, of the tap-spindles are provided with a plurality of cutters 138 (see Figs. 15 and 16) which by their revolution and contact with the face sides of the tapped nuts will remove any bur that may be formed on the face side of the nut by the thread cutting operation and will remove such portion of the face side of the threaded nut as may be necessary to give it a proper face. The amount of material removed by the cutters 138, in the facing operation may be readily regulated by moving the vertical portions 82, with respect to the piston carrying and releasing plates 85, through the medium of the adjusting bolt 84, and nut 86.

From the foregoing description, taken in connection with the accompanying drawings, the operations and advantages of my invention will be readily understood.

Having thus described my invention, without having attempted to set forth all the forms in which it may be made or all the modes of its use, I declare that what I claim and desire to secure by Letters Patent, is,—

1. In a nut-tapping machine, a spindle provided with a tap socket having nut facing cutters, a tap, and means for driving the nut over said tap and holding the same in engagement with said nut facing cutters.

2. In a nut-tapping machine, a reciprocatory nut-blank feeding carriage, a tap holding and reciprocating device comprising a guide supporting-plate, and guide-jaws having their bearing sides longitudinally grooved and provided with inwardly converging beveled outer ends adapted to be engaged by the nut-blank feeding carriage.

3. In a nut-tapping machine, a revoluble turret carrying a plurality of spindles provided with tap-sockets, a plurality of taps carried by said turret and independently supported in axial line with said spindles, and means for moving said taps into and out of said tap-sockets while the turret is being revolved.

4. In a nut-tapping machine, a revoluble turret carrying an intermittently revolving tap spindle, a tap independently supported and removably mounted in axial line with said tap spindle, and means for moving said tap into engagement with said tap spindle while the turret is being revolved.

5. In a nut-tapping machine, a revoluble turret carrying a plurality of intermittently revolving tap spindles and independently supported taps adapted to be moved into engagement with said tap spindles while the turret is being revolved, and nut-blank holding and feeding mechanism adapted to be reciprocated while the turret is in its normal position whereby the nut-blank is fed over the revolving tap and is adapted to be stripped from the opposite end when the latter is withdrawn from the adjacent tap spindle.

6. In a nut-tapping machine a revoluble tap spindle, a tap holding and reciprocating device adapted to carry the tap into and out of engagement with said tap spindle and comprising a reciprocating guide supporting-plate, spring resisted tap-carrying guide-jaws carried by said supporting-plate, and link-arms provided with inwardly-extending guide-hooks pivotally secured to the outer ends of said guide-jaws whereby said guide-jaws are simultaneously and uniformly expanded when engaged by the nut-blank feeding carriage.

7. In a nut-tapping machine, a revoluble turret carrying a plurality of intermittently revolving tap-carrying spindles, guide supporting-plates carried by said turret, tap-carrying guide jaws mounted on said guide supporting-plates, taps mounted in said guide-jaws, and a cam-plate in engagement with said guide supporting-plates whereby said guide-jaws are reciprocated to carry said taps into and out of engagement with said spindles.

8. In a nut-tapping machine, a revoluble turret carrying a plurality of radially-extending spindles, guide supporting-plates mounted on said turret and provided with guide-jaws, taps interposed between said guide-jaws, a cam-plate in engagement with said guide supporting-plates and adapted to carry said taps into and out of engagement with said spindles while the turret is being revolved, and means for engaging and withdrawing the tapped nuts from said taps when the latter are withdrawn from said spindles.

9. In a nut-tapping machine, a revoluble turret provided with a plurality of guide-ways, guide supporting-plates mounted in said guide-ways, guide-jaws carried by said guide supporting-plates, a plurality of spindles carried by said turret and provided at their ends with tap-sockets, taps carried by said guide-jaws, a cam-plate engaging said guide supporting-plates and adapted to carry said taps into and out of engagement with said tap-sockets, means for revolving the spindles when said taps are moved into engagement with the tap-sockets thereof, and means for intermittently revolving said turret.

10. In a nut-tapping machine, an intermittently revolving turret carrying a plurality of revoluble tap spindles, means for revolving oppositely-disposed spindles when the turret is in its normal position, tap holding and reciprocating devices carried by said turret, taps mounted in said tap holding and reciprocating devices, and means for moving oppositely-disposed tap holding and reciprocating devices, whereby the taps carried thereby are brought into engagement with oppositely-disposed spindles while the latter are being revolved.

11. In a nut-tapping machine, a revoluble turret carrying a plurality of revoluble tap-spindles, means for intermittently revolving said turret, means for revolving oppositely-disposed tap spindles when the turret is in its normal position, tap holding and reciprocating devices, taps carried thereby, means for moving said tap holding and reciprocating devices whereby said taps are carried into and out of engagement with said revolving tap spindles, and means for engaging and detaching the tapped nut when said taps are carried out of engagement with said tap spindles.

12. In a nut-tapping machine, the combination with an intermittently revolving horizontally-movable tap spindle; of tap holding and reciprocating devices, a tap carried by said holding and reciprocating devices in axial line with said tap spindle, means for reciprocating said devices whereby said tap is carried into and out of engagement with said tap spindle while the same is being revolved, and means for engaging and carrying the tapped nut off of said tap when the latter is carried out of engagement with said spindle.

13. In a nut-tapping machine, the combination with an intermittently revolving turret carrying a tap spindle, and means for revolving said spindle when the turret is in its normal position; of tap holding and reciprocating devices carried by said turret, a tap carried thereby, a nut-blank holding and feeding carriage adapted to engage said tap and feed the nut-blank thereon, and means for returning said carriage when the nut is finished.

14. In a nut-tapping machine, a revoluble tap spindle, means for intermittently revolving said tap spindle, tap holding and reciprocating devices, a tap carried thereby, means for reciprocating said devices to carry said tap into and out of said tap spindle, a nut-blank holding and feeding carriage adapted to engage said tap and feed the nut-blank thereover, means for returning said carriage to its initial position, and means for disengaging the tapped nut when the carriage is returned.

15. In a nut-tapping machine, a revoluble turret carrying a tap spindle, means for revolving said spindle when the turret is in its normal position, tap holding and reciprocating devices carried by said turret, a tap carried in said holding and reciprocating devices, means for reciprocating said devices while the turret is being revolved, a nut-blank holding and feeding carriage adapted to engage said tap and feed the nut-blank on said tap while the turret is in its normal position, means for locking said turret in its normal position, means for releasing said locking means and permitting said carriage to return to its initial position when the latter has been moved to its extreme feeding position, and means for revolving said turret when said carriage has been returned.

16. In a nut-tapping machine, the combination with a revoluble turret carrying a tap spindle, means for revolving said spindle when the turret is in its normal position, a reciprocating guide supporting-plate carried by said turret, tap-carrying guide-jaws carried by said guide supporting-plate, a tap interposed between said guide-jaws, and means for reciprocating said guide supporting-plate while the turret is being revolved whereby said tap is carried into and out of engagement with said spindle; of a nut-blank holding and feeding carriage adapted to engage said tap and feed the nut-blank on said tap and between said guide-jaws when said turret is in its normal position, means for returning said nut-blank holding and feeding carriage when moved to its normal feeding position, and means for revolving said turret when said carriage has been returned to its initial position.

17. In a nut-tapping machine, the combination with an intermittently revolving turret carrying a plurality of radially-extending tap-revolving spindles, pinions loosely mounted on said spindles, clutch mechanism for intermittently revolving said turret and means for continuously revolving said pinions; of a stationary cam-head interposed between the inner ends of said spindles and provided with oppositely-disposed cam projections adapted to simultaneously move and hold oppositely disposed spindles in gear with the pinions mounted thereon, radially-extending reciprocating supporting-plates mounted on said turret and provided with spring-resisted guide-jaws taps carried between said guide-jaws, and a cam-plate reciprocating said supporting plates, as the turret is revolved whereby said taps are moved into engagement with said oppositely-disposed spindles while being revolved.

18. A nut-tapping machine, comprising a revoluble turret, a plurality of radially-extending spindles carried by said turret, tap-carrying sockets carried by said spindles, means for intermittently revolving said turret, means for revolving diametrically-opposite spindles when said turret is in its normal position, nut-blank holding and feeding carriages on opposite sides of said turret, pneumatic means for moving said carriages toward said diametrically-opposite spindles when the latter are being revolved, and means controlled through the driving mechanism for releasing the fluid pressure and returning said carriages after they have been moved to their extreme forward positions.

19. In a nut-tapping machine, a tap holding and reciprocating device comprising a guide supporting plate, guide-jaws provided with tap recess pockets and flaring guide ends, and link-arms pivotally secured to said flaring guide ends whereby said guide-jaws are uniformly expanded when engaged by the nut blank feeding carriage.

20. In a nut-tapping machine, the combination with a revoluble turret carrying a plurality of tap spindles, tap holding and reciprocating devices adapted to be reciprocated while the turret is being revolved, and taps normally carried by said tap holding and reciprocating devices; of pneumatically operated nut-blank holding and feeding carriages adapted to engage said taps and feed the nut-blanks thereon while said taps are held in engagement with said tap-spindles and the turret is in its normal position, and means for releasing the pressure of the operating fluid on said carriages when the latter have been moved to their extreme positions.

21. In a nut-tapping machine, an intermittently revolving turret carrying a plurality of spindles, means for revolving some of said spindles when the turret is in its normal position, a plurality of reciprocating taps independently carried by said turret in operative relationship to said spindles, and means for holding some of said taps in engagement with the revolving spindles when the turret is in its normal position.

22. In a nut-tapping machine, a turret carrying a plurality of spindles, means for revolving some of said spindles when the turret is in its normal position, a plurality of taps independently mounted upon said turret in operative relationship to said spindles, means for moving and holding some of said taps in engagement with the revolving spindles, and nut blank holding and feeding mechanism adapted to engage the outer ends of said engaged and revolving taps to feed nut blanks thereon while the turret is in its normal position.

23. In a nut-tapping machine, a revoluble tap-spindle, a pair of reciprocating tap guide-jaws, a tap interposed between said guide-jaws, a nut-blank holding and feeding carriage adapted to engage said tap and feed the nut blank thereon and between said guide-jaws when the tap-spindle is being revolved means for returning said carriage, means for withdrawing said tap from said tap-spindle, and means for discharging the tap-nut from said tap when the latter is withdrawn.

24. In a nut-tapping machine, an intermittently-revolving turret carrying a plurality of spindles, means for revolving some of said spindles when the turret is in its normal position, a plurality of taps independently carried by said turret, and means for holding some of said taps in engagement with the revolving spindles when the turret is in its normal position and for moving the same out of engagement therewith while the turret is being revolved.

In testimony whereof I have affixed my signature, in presence of two witnesses.

JOHN BOMA.

Witnesses:
 FRANK BILLMAN,
 O. C. BILLMAN.